United States Patent
Oguchi et al.

(10) Patent No.: US 10,931,458 B2
(45) Date of Patent: Feb. 23, 2021

(54) AUTHENTICATION SYSTEM

(71) Applicant: Honda Motor Co., Ltd., Tokyo (JP)

(72) Inventors: Ryosuke Oguchi, Wako (JP); Hidekazu Oki, Wako (JP); Yoshiyuki Amanuma, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/931,590

(22) Filed: May 14, 2020

(65) Prior Publication Data

US 2020/0382313 A1    Dec. 3, 2020

(30) Foreign Application Priority Data

May 31, 2019   (JP) .............................. JP2019-102042

(51) Int. Cl.
*H04L 29/06*   (2006.01)
*H04L 9/32*   (2006.01)
(Continued)

(52) U.S. Cl.
CPC .............. *H04L 9/3247* (2013.01); *G06F 8/65* (2013.01); *H04L 9/0656* (2013.01); *H04L 67/12* (2013.01);
(Continued)

(58) Field of Classification Search
CPC ... H04L 9/3247; H04L 9/0891; H04L 9/0656; H04L 9/0869; H04L 9/3271; H04L 9/3273; H04L 9/0844; H04L 9/3242; H04L 9/321; H04L 9/3236; H04L 9/0822; H04L 9/32; H04L 9/14; H04L 9/30; H04L 9/083;
(Continued)

(56) References Cited

U.S. PATENT DOCUMENTS 10,447,483 B1 * 10/2019 Su ........................ H04L 9/0643
2002/0002703 A1 * 1/2002 Baentsch ............. G06F 21/105
717/170
(Continued)

FOREIGN PATENT DOCUMENTS

JP         2014048800 A      3/2014

*Primary Examiner* — David Garcia Cervetti
(74) *Attorney, Agent, or Firm* — Duft & Bornsen, PC

(57) ABSTRACT

An authentication system includes a vehicle onboard ECU, an update tool for vehicle control software, and an authentication server for the update tool. The update tool substitutes predetermined-constant and first-random-number into predetermined-function to generate first-value and send it to the authentication server. The authentication server signs the first-value using secret-key and send it to the update tool. The update tool transmits the first-value and signature to the ECU upon connection. The ECU verifies the signature using public-key and substitutes the predetermined-constant and second-random-number into the predetermined-function to generate second-value and send it to the update tool. The update tool substitutes the second-value and first-random-number into the predetermined-function to generate third-value. The ECU substitutes the first-value and second-random-number into the predetermined-function to generate fourth-value upon verification of the signature. The ECU allows vehicle control software update by the update tool when the third-value and fourth-value are identical.

8 Claims, 13 Drawing Sheets

(51) Int. Cl.
  *H04L 9/06*    (2006.01)
  *H04W 12/06*   (2021.01)
  *G06F 8/65*    (2018.01)
  *H04L 29/08*   (2006.01)

(52) U.S. Cl.
  CPC ..... *H04L 67/2852* (2013.01); *H04W 12/0609* (2019.01)

(58) Field of Classification Search
  CPC ... H04L 9/0838; H04L 8/3268; H04L 9/0841; H04L 9/0861; H04L 9/3263; H04L 9/3226; H04L 9/0825; H04L 67/2852; H04L 2009/80; H04L 2209/805; H04L 67/12; G06F 8/65; G06F 21/44; H04W 12/0609
  See application file for complete search history.

(56) References Cited

U.S. PATENT DOCUMENTS

| | | | | |
|---|---|---|---|---|
| 2010/0175061 A1* | 7/2010 | Maeda | G06F 8/65 | 717/173 |
| 2011/0296180 A1* | 12/2011 | Paeschke | B60R 13/10 | 713/168 |
| 2013/0227650 A1* | 8/2013 | Miyake | H04L 63/08 | 726/3 |
| 2014/0114497 A1* | 4/2014 | Miyake | H04L 9/3271 | 701/1 |
| 2014/0282490 A1* | 9/2014 | Shinomiya | G06F 8/61 | 717/174 |
| 2014/0325592 A1* | 10/2014 | Unagami | G06Q 30/02 | 726/1 |
| 2015/0113520 A1* | 4/2015 | Kotani | G06F 8/65 | 717/172 |
| 2015/0180840 A1* | 6/2015 | Jung | H04L 67/34 | 713/150 |
| 2016/0028549 A1* | 1/2016 | Yuji | G06F 21/31 | 713/176 |
| 2016/0035148 A1* | 2/2016 | Huang | H04L 9/0866 | 701/31.4 |
| 2016/0330204 A1* | 11/2016 | Baur | H04L 63/0869 | |
| 2016/0344704 A1* | 11/2016 | Stumpf | H04L 63/10 | |
| 2016/0344705 A1* | 11/2016 | Stumpf | H04L 67/12 | |
| 2017/0060559 A1* | 3/2017 | Ye | H04L 67/12 | |
| 2017/0099152 A1* | 4/2017 | Kojima | H04L 9/14 | |
| 2017/0099273 A1* | 4/2017 | Kojima | H04W 12/04071 | |
| 2017/0118023 A1* | 4/2017 | Gussen | H04L 67/12 | |
| 2017/0180314 A1* | 6/2017 | Walker | H04L 9/083 | |
| 2017/0180341 A1* | 6/2017 | Walker | H04L 9/3236 | |
| 2018/0048473 A1* | 2/2018 | Miller | H04L 9/3247 | |
| 2018/0189049 A1* | 7/2018 | Madrid | G06F 21/78 | |
| 2018/0217828 A1* | 8/2018 | Madrid | H04L 63/0428 | |
| 2018/0234248 A1* | 8/2018 | Imamoto | H04W 12/1006 | |
| 2018/0365423 A1* | 12/2018 | Poppe | G05B 19/0426 | |
| 2019/0056925 A1* | 2/2019 | Komano | H04L 41/0866 | |
| 2019/0057214 A1* | 2/2019 | Xia | G06F 21/44 | |
| 2019/0163466 A1* | 5/2019 | Kiyama | G07C 5/008 | |
| 2019/0184916 A1* | 6/2019 | Troia | H04W 12/06 | |
| 2019/0187971 A1* | 6/2019 | Wang | G06F 8/65 | |
| 2019/0281449 A1* | 9/2019 | Luo | H04L 9/3268 | |
| 2019/0312734 A1* | 10/2019 | Wentz | H04L 9/3247 | |
| 2019/0394046 A1* | 12/2019 | Su | G06F 8/65 | |
| 2020/0057630 A1* | 2/2020 | Cho | B60R 16/0234 | |
| 2020/0057872 A1* | 2/2020 | Ingraham | H04L 9/3263 | |
| 2020/0073651 A1* | 3/2020 | Rodriguez Bravo | H04L 63/123 | |
| 2020/0151972 A1* | 5/2020 | Nakajima | G06F 16/9035 | |
| 2020/0153636 A1* | 5/2020 | Takada | G09C 1/00 | |
| 2020/0162269 A1* | 5/2020 | Nix | H04L 9/3252 | |
| 2020/0249937 A1* | 8/2020 | Teraoka | B60R 16/02 | |
| 2020/0304299 A1* | 9/2020 | Medvinsky | H04L 9/0894 | |

* cited by examiner

AUTHENTICATION SYSTEM

CROSS-REFERENCE TO RELATED APPLICATION

This application is based upon and claims the benefit of priority from Japanese Patent Application No. 2019-102042 filed on May 31, 2019, the content of which is incorporated herein by reference.

BACKGROUND OF THE INVENTION

Field of the Invention

This invention relates to an authentication system for authenticating an update tool for updating vehicle control software.

Description of the Related Art

Systems are known that authenticate validity of a vehicle software update tool using an authentication server. In the system taught by JP2014-48800A, for example, an updater computer transmits attestation data to an authentication server and the authentication server uses the attestation data to confirm validity of the computer and generate authentication information, whereby equipment onboard the vehicle confirms the authentication information and allows connection to the computer.

However, updating of vehicle software outside the network range is difficult with the system according to JP2014-48800A because the computer (update tool for updating software) needs to connect to the authentication server when updating software.

SUMMARY OF THE INVENTION

An aspect of the present invention is an authentication system, including: an electronic control unit installed in a vehicle and configured to control operation of the vehicle; an update tool configured to be communicatively connected to the electronic control unit to update a control software of the electronic control unit; and an authentication server configured to be communicatively connected to the update tool to authenticate validity of the update tool. The update tool includes a first CPU and a first memory coupled to the first CPU. The first CPU and the first memory are configured to perform generating a first random number, substituting a predetermined constant and the first random number generated into a predetermined function to generate a first value, storing the first value generated in the first memory, and transmitting the first value stored in the first memory to the authentication server. The authentication server includes a second CPU and a second memory coupled to the second CPU. The second CPU and the second memory are configured to perform generating a signature of the first value transmitted from the update tool using a predetermined secret key, transmitting the signature generated to the update tool. The first CPU and the first memory are configured to perform storing the signature transmitted from the authentication server in the first memory, and transmitting the first value and the signature stored in the first memory to the electronic control unit when the update tool is connected to the electronic control unit. The electronic control unit includes a third CPU and a third memory coupled to the third CPU. The third CPU and the third memory are configured to perform verifying whether the signature transmitted from the update tool is valid using a predetermined public key corresponding to the predetermined secret key, generating a second random number, substituting the predetermined constant and the second random number generated into the predetermined function to generate a second value, and transmitting the second value generated to the update tool. The first CPU and the first memory are configured to perform substituting the second value transmitted from the electronic control unit and the first random number generated on the side of the update tool into the predetermined function to generate a third value. The third CPU and the third memory are configured to perform substituting the first value transmitted from the update tool and the second random number generated into the predetermined function to generate a fourth value when it is verified that the signature is valid, determining whether the third value generated on the side of the update tool and the fourth value generated on the side of the electronic control unit are identical, and when determined to be identical, determining that the update tool is an update tool whose validity was authenticated by the authentication server, and allowing update of the control software by the update tool.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
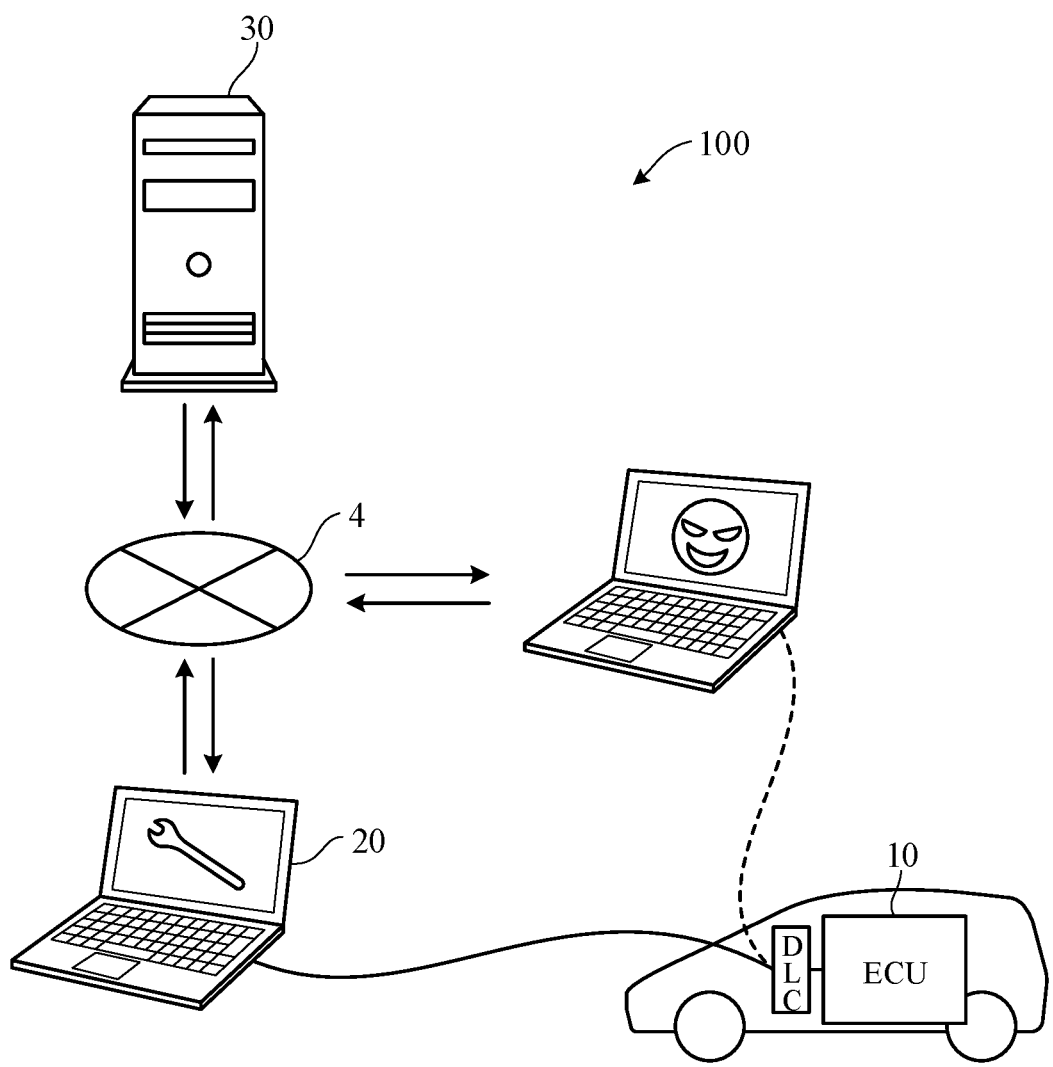
FIG. 1 is a diagram showing overall configuration of an authentication system according to an embodiment of the present invention.

An embodiment of the present invention is explained with reference to FIGS. 1 to 13 in the following. FIG. 1 is a diagram showing overall configuration of an authentication system 100 according to an embodiment of the present invention. The authentication system 100 includes a vehicle onboard Electronic Control Unit (ECU) 10 for controlling behavior of a vehicle, an update tool 20 that is connected to the ECU 10 for updating vehicle control software, and an authentication server 30 for authenticating validity of the update tool 20. The ECU 10 and update tool 20 are, for example, wire-connected through a vehicle Data Link Coupler (DLC) by a Controller Area Network (CAN). The update tool 20 and authentication server 30 are connected through a network 4 including the Internet or other public wireless telecommunication network.

The vehicle maker distributes software updates, through dealers for example, as necessary for updating, improving quality or the like of vehicle control software. When a vehicle owner (customer) visits a dealer, the dealer updates the program of the owner's vehicle by connecting the update tool 20 downloaded with the software update to the vehicle's ECU 10. In order prevent rewriting of the vehicle control software by ill-intentioned third parties using malicious hardware or software, the ECU 10 allows updates only by an update tool 20 authenticated by the authentication server 30. But it is hard for the update tool 20 to acquire authentication from the authentication server 30 in a case where update of the vehicle control software unavoidably has to be performed outside range of the network 4. In order to overcome this inconvenience, the authentication system 100 according to the present embodiment of the invention is configured as set out in the following to enable vehicle control software updating outside network range while ensuring exclusion of malicious access.

Figure 2:
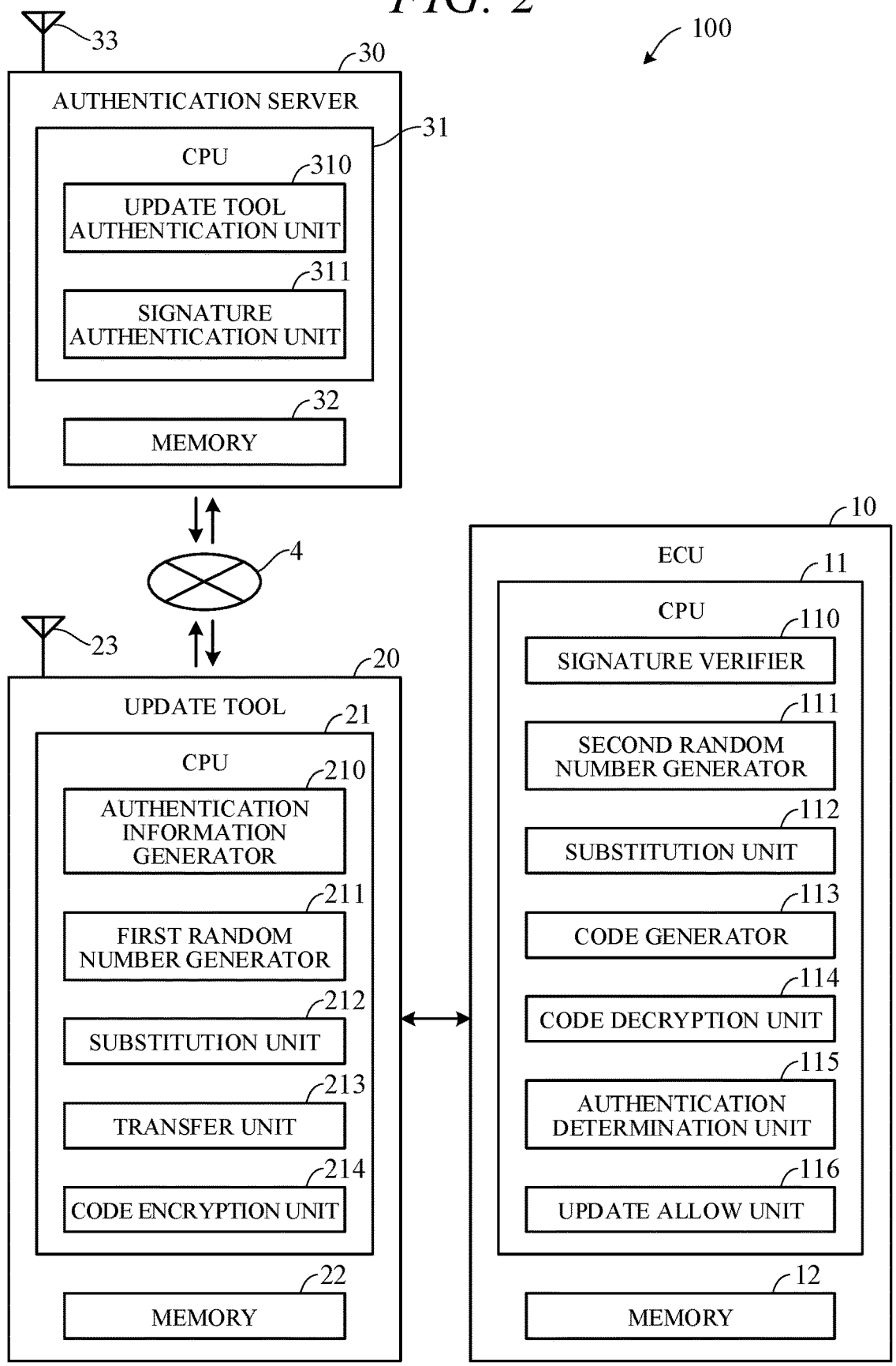
FIG. 2 is a block diagram showing an example structure of the authentication system according to the embodiment of the present invention.

FIG. 2 is a block diagram showing an example structure of the authentication system 100 in overview. As shown in FIG. 2, the authentication system 100 includes the ECU 10, the update tool 20 connectable to the ECU 10 through CAN or the like, and the authentication server 30 connectable to the update tool 20 through the network 4.

The update tool 20 is a diagnostic tool or other dedicated tool connected to the vehicle for acquiring vehicle operation history and other vehicle information. The vehicle maker assigns the user of the update tool 20 authentication information including an ID and password in advance and also installs dedicated software in the update tool 20. The update tool 20 is configured to include a computer having a CPU 21, ROM, RAM, hard disk and other memory 22, and other peripheral circuits, and is connectable to the network 4 through a communication unit 23. The CPU 21 functions as an authentication information generator 210, a first random number generator 211, a substitution unit 212, a transfer unit 213, and a code encryption unit 214.

In order to achieve secure, high-speed transmission-reception in data communication between the update tool 20 and ECU 10 that perform vehicle control software update, common key cryptography using the same common key for data encryption and decryption is adopted. For example, key exchange is performed between the update tool 20 and the ECU 10 using the Diffie-Hellman key exchange algorithm based on the discrete logarithm problem so as to enable mutual generation and sharing of the same common key without need to share a common key in advance. The elliptic curve Diffie-Hellman key exchange algorithm using the elliptic curve discrete logarithm problem can be adopted. An example of key exchange using the Diffie-Hellman key exchange algorithm is explained in the following.

Upon user input of an authentication request, the authentication information generator 210 generates authentication information of the update tool 20 and transmits the generated information to the authentication server 30. User intending to use the update tool 20 to update vehicle control software outside range of the network 4 in advance enters an authentication request in the update tool 20 and receives authentication by the authentication server 30 while within range of the network 4. The authentication information includes identification information including an ID and a password assigned to the user of the update tool 20 by the vehicle maker. The authentication server 30 authenticates validity of the update tool 20 hardware by verifying the authentication information transmitted from the update tool 20. Attestation data verifying the software configuration of the update tool 20 can also be included in the authentication information. The authentication server 30 authenticates validity of the update tool 20 software by verifying the attestation data transmitted from the update tool 20.

The authentication request can designate a validity period. For example, the estimated period during which vehicle control software updating is expected to be performed outside range of the network 4 can be designated as the validity period. The authentication information generator 210 transmits the validity period designated in the authentication request to the authentication server 30 together with the authentication information.

The first random number generator 211 generates a first random number a that is an update tool 20 side secret key in the Diffie-Hellman key exchange algorithm. The first random number a is an integer of two or more randomly generated at the time of the authentication request.

By substituting a predesignated constant G (integer) and the first random number generated by the first random number generator 211 into a predetermined function F, the substitution unit 212 generates a first value A, which is a public key for key exchange (Formulas (i) and (ii)). Defining value N in Formulas (i) and (ii) as a large prime number makes it extremely difficult to determine the secret key (first random number a) from the public key for key exchange (first value A).

$$F(x,y) = x^y \bmod N \qquad (i)$$

$$A = F(G,a) = G^a \bmod N \qquad (ii)$$

The first value A generated by the substitution unit 212 is stored in the memory 22 and is transmitted through the network 4 to the authentication server 30. When a validity period is designated in the authentication request, that information is also sent to the authentication server 30 at this time. Once validity of the update tool 20 is authenticated, the authentication server 30 generates a signature of the first value A received from the update tool 20 and transmits the signature through the network to the update tool 20. The signature received from the authentication server 30 is stored in the memory 22.

When the update tool 20 is wire-connected to the ECU 10 through CAN or the like, the transfer unit 213 transfers the first value A and signature stored in the memory 22 to the ECU 10. Upon receiving the first value A and signature from the update tool 20, the ECU 10 verifies the signature and allows key exchange with the update tool 20 when the signature is confirmed valid. After allowing key exchange, the ECU generates, similarly to on the update tool 20 side, a second value B (Formula (iii)), which is a public key for key exchange, transmits the second value B to the update tool 20, and further generates and transmits to the update tool 20 a challenge code discussed later.

$$B = F(G,b) = G^b \bmod N \qquad (iii)$$

Upon receiving the second value B, which is a public key, from the ECU 10, the substitution unit 212 substitutes the received second value B and the first random number a generated by the first random number generator 211 into the function F to generate a third value C (Formula (iv)) to be a common key used in data communication with the ECU 10. Optionally, the third value C can be additionally processed. In such case, fourth value discussed later is also similarly processed. The third value C generated by the substitution unit 212 is stored in the memory 22.

$$C=F(B,a)=B\text{^}a \bmod N \quad (iv)$$

The code encryption unit 214 uses the third value C, which is a common key generated by the substitution unit 212, to encrypt a challenge code (discussed later) received from the ECU 10. For example, the code encryption unit 214 combines the challenge code received from the ECU 10 and the third value C generated by the substitution unit 212, and transmits it to the ECU 10 as a response code converted to a hash value using a known hash function.

The authentication server 30 is configured to include a computer having a CPU 31, ROM, RAM, hard disk and other memory 32, and other peripheral circuits, and is connectable to the network 4 through a communication unit 33. The CPU 31 functions as an update tool authentication unit 310 and a signature authentication unit 311.

The memory 32 stores public key cryptographic scheme secret keys. Public keys associated with the secret keys are recorded at time of manufacturing the ECU 10.

The update tool authentication unit 310 verifies authentication information received from the update tool 20 and authenticates validity of the update tool 20. For example, validity of the update tool 20 hardware is authenticated upon confirmation that the ID and password received from the update tool 20 are ones assigned by the vehicle maker, and validity of the update tool 20 software is authenticated upon confirmation that software configuration of the update tool 20 is identical with dedicated software prescribed by the vehicle maker.

When validity of the update tool 20 is confirmed by the update tool authentication unit 310, the signature authentication unit 311 uses the secret key stored in the memory 32 to generate the signature of the first value A received from the update tool 20. Specifically, the signature authentication unit 311 uses a known hash function to convert the first value A received from the update tool 20 to a hash value, uses the secret key to generate a signature by encoding the hash value, and transmits the signature through the network 4 to the update tool 20. The signature is assigned a validity period. The validity period of the signature can be set as certain time span (e.g., 24 hours from authentication) or be set in accordance with a validity period transmitted from the update tool 20. Alternatively, the signature validity period can be set so as to be forcibly terminated when the update tool 20 re-enters range of the network 4 after being present outside range of the network 4 for longer than a certain time period (e.g., 10 minutes) after being authenticated by the server 30. Namely, when the update tool 20 authenticated by the authentication server 30 is brought back to a predetermined location inside range of the network 4 after completing its purpose outside range of the network 4, the remainder of the validity period can be considered unnecessary.

The ECU 10 is configured as an electronic control unit comprising multiple ECUs differing in function, including, inter alia, an engine control ECU and a transmission control ECU. The ECU 10 is configured to include a computer having a CPU 11, ROM, RAM, hard disk and other memory 12, and other peripheral circuits. The CPU 11 functions as a signature verifier 110, a second random number generator 111, a substitution unit 112, a code generator 113, a code decryption unit 114, an authentication determination unit 115 and an update allow unit 116.

The memory 12 stores a public key corresponding to a secret key stored in the authentication server 30. In the public key cryptographic scheme, mutually different public key and secret key pairs are generated and pre-shared between information/data transmitting side and receiving side. Information/data encrypted using one between the public key and the secret key is decrypted using the other thereof. For example, information/data encrypted using the secret key of the authentication server 30 is decrypted using the public key of the ECU 10. This enables secure transmission and reception of information/data over the network 4.

The signature verifier 110 verifies validity of the signature received from the update tool 20 using the public key stored in the memory 12. For example, it uses the public key to decrypt and revert to hash value the signature received from the update tool 20, generates hash value of the first value A received from the update tool 20, and verifies validity of the signature based on whether the hash values match. This makes it possible to confirm that the first value A received from the update tool 20 was signed by the authentication server 30 and that it was not altered after authentication. The signature verifier 110 can also confirm whether current time is within signature validity period. Upon confirmation of signature validity, the signature verifier 110 allows key exchange with the update tool 20.

Once the signature verifier 110 allows key exchange, the second random number generator 111 generates a second random number b (integer of two or more), which is the ECU 10 side secret key.

The substitution unit 112 substitutes the constant G and the second random number b generated by the second random number generator 111 into the function F to generate the second value B (Formula (iii)), which is the ECU 10 side public key, and transmits it to the update tool 20 through CAN or the like. The substitution unit 112 substitutes the first value A, which is the public key received from the update tool 20, and the second random number b generated by the second random number generator 111 into the function F to generate a fourth value D to be a common key used in data communication with the update tool 20 (Formula (v)). Optionally, the fourth value D can be additionally processed. In such case, the third value C discussed earlier is also similarly processed. The fourth value D generated by the substitution unit 112 is stored in the memory 12.

$$D=F(A,b)=A\text{^}b \bmod N \quad (v)$$

Here, from Formulas (ii) to (v), insofar as the first random number a, which is the update tool 20 side secret key, was not altered after authentication, the fourth value D, which is the common key generated on the ECU 10 side, is identical in value with the third value C, which is the common key generated on the update tool 20 side (Formula (vi)).

$$\begin{aligned} D &= A \wedge b \bmod N \\ &= (G \wedge a \bmod N) \wedge b \bmod N \\ &= G \wedge ab \bmod N \\ &= (G \wedge b \bmod N) \wedge a \bmod N \\ &= B \wedge a \bmod N = C \end{aligned} \quad (vi)$$

In the authentication system 100, whether the update tool 20 is one whose validity was authenticated by the authentication server 30 is determined by determining whether the fourth value D, which is the ECU 10 side common key, and the third value C, which is the update tool 20 side common key, are identical values. It therefore becomes possible outside range of the network 4 to confirm from the ECU 10 side whether the update tool 20 is one whose validity was authenticated by the authentication server 30.

Upon connection of the update tool 20, the code generator 113 generates a code composed of random numbers that it transmits to the update tool 20 as a challenge code. A challenge code is a kind of one-time password that changes irregularly every time generated. The code generated by the code generator 113 is stored in the memory 12. The update tool 20 encrypts the challenge code received from the ECU 10 using the common key (third value C) and transmits it to the ECU 10 as a response code.

The code decryption unit 114 decrypts the response code received from the update tool 20 using the common key (fourth value D) stored in the memory 12. Insofar as the ECU 10 side common key (fourth value D) stored in the memory 12 is identical in value with the update tool 20 side common key (third value C), the code encrypted on the update tool 20 side decrypts to the same value as the original code on the ECU 10 side.

The authentication determination unit 115 determines whether the code decrypted by the code decryption unit 114 and the code generated by the code generator 113 are identical, and when it determines them to be identical, determines that the third value C and the fourth value D, which are common keys, are identical in value. When the common keys of both the ECU 10 and the update tool 20 are determined to be identical in value, the update tool 20 is determined to be one whose validity was authenticated by the authentication server 30.

When the update tool 20 is determined by the authentication determination unit 115 to be one authenticated by the authentication server 30, the update allow unit 116 allows access into secure region of the ECU 10 by the update tool 20 and update of vehicle control software.

Figure 3:
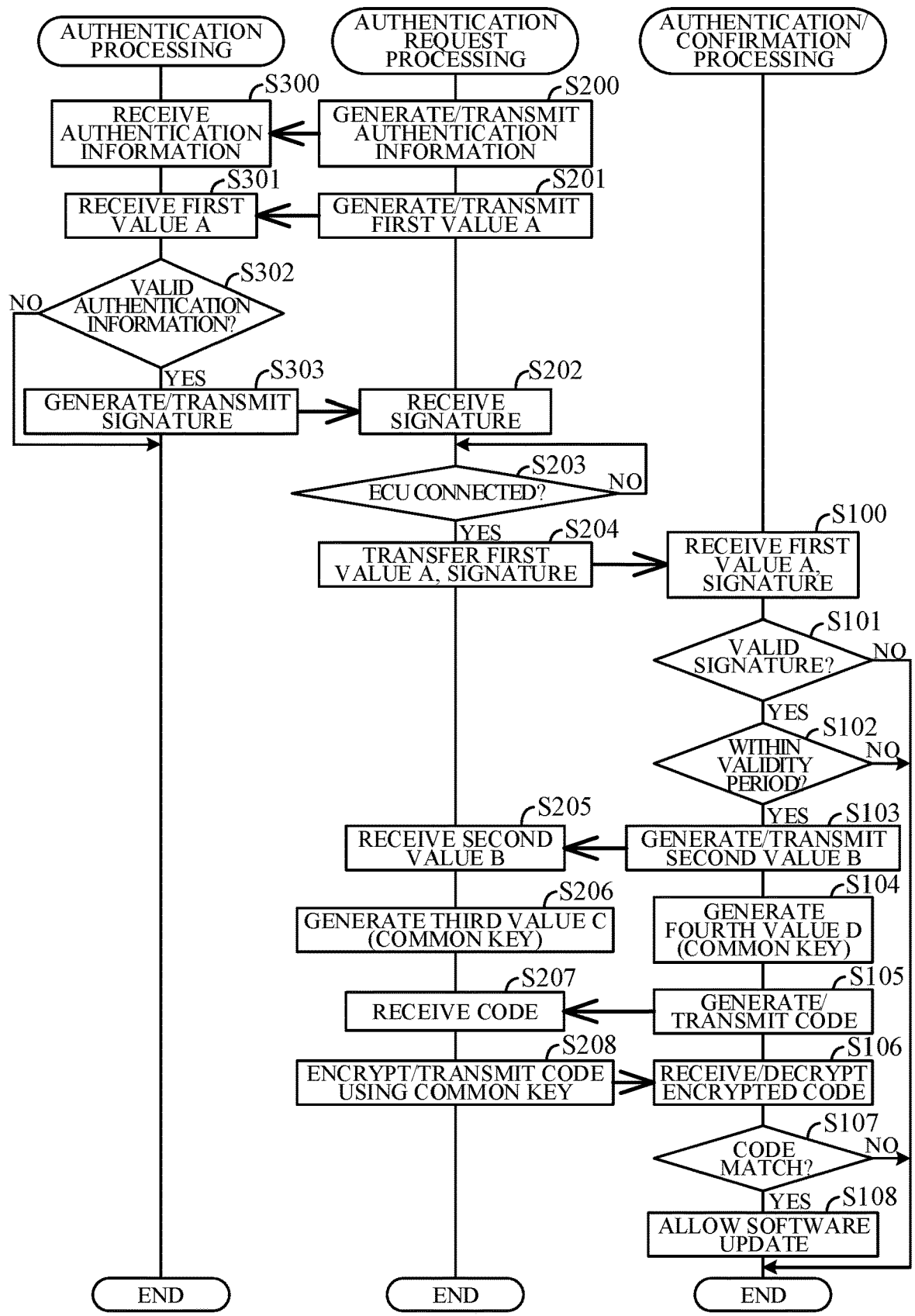
FIG. 3 is a flowchart showing an example of processing performed by the authentication system of FIG. 2.

FIG. 3 is a flowchart showing an example of processing performed by the authentication system 100 in accordance with a program loaded in memory in advance, namely, an example of authentication/confirmation processing performed by the CPU 11 of the ECU 10, authentication request processing performed by the CPU 21 of the update tool 20, and authentication processing performed by the CPU 31 of the authentication server 30. The processing indicated by this flowchart is started, for example, when an authentication request is input to the update tool 20 by user.

In authentication request processing performed by the update tool 20, first, in S200 (S: processing Step), the authentication information generator 210 generates and transmits to the authentication server 30 update tool 20 authentication information. Next, in S201, the first random number generator 211 generates the first random number a (secret key), and the substitution unit 212 generates the first value A (public key for key exchange) by substituting the constant G and the first random number a into the function F. The generated first value A is transmitted to the authentication server 30 together with the validity period designated in the authentication request.

In authentication processing by the authentication server 30, the authentication information and the first value A transmitted from the update tool 20 are received through the communication unit 33 in S300 and S301, respectively.

Next, in S302, the update tool authentication unit 310 authenticates validity of the update tool 20 by verifying the authentication information. When validity of the update tool 20 is authenticated in S302, next, in S303, the signature authentication unit 311 uses pre-shared secret keys to encrypt hash value of the first value A to generate and transmit to the update tool 20 a validity period tagged signature. When validity of the update tool 20 is not authenticated in S302, authentication processing by the authentication server 30 is terminated.

Upon receiving the validity period tagged signature from the authentication server 30 through the communication unit 23 in S202, the update tool 20 stands by in S203 until the update tool 20 is connected to the ECU 10. When the update tool 20 is connected to the ECU 10 in S203, the transfer unit 213 in S204 transfers the first value A (public key) stored in the memory 22 and the validity period tagged signature to the ECU 10.

In the authentication/confirmation processing by the ECU 10, the ECU 10 in S100 receives the first value A (public key) and validity period tagged signature transmitted from the update tool 20 through CAN or the like. Next, in S101, the signature verifier 110 uses a pre-shared public key to decrypt and revert to hash value the signature received from the update tool 20, generates hash value of the first value A, and verifies validity of the signature based on whether the hash values match. When validity of the signature is confirmed in S101, whether current time is within signature validity period is determined in S102. When the result is NO in S101 or S102, i.e., when validity of the signature is not confirmed, authentication/confirmation processing by the ECU 10 is terminated.

When the results in S101 and S102 are YES, i.e., when validity of the signature is confirmed, the program goes to S103, in which the second random number generator 111 generates the second random number b (secret key), and the substitution unit 112 generates the second value B (public key for key exchange) by substituting the constant G and the second random number b into the function F, and transmits the generated second value B to the update tool 20. Next, in S104, the substitution unit 112 generates the fourth value D (common key) by substituting the first value A (public key) received in S100 and the second random number b (secret key) generated in S103 into the function F. Next, in S105, the code generator 113 generates a code composed of random numbers that it transmits to the update tool 20 as a challenge code.

In the update tool 20, after the second value B transmitted from the ECU 10 is received in S205, the substitution unit 212 generates the third value C (common key) in S206. Specifically, the substitution unit 212 generates the third value C (common key) by substituting the second value B (public key) received in S205 and the first random number a (secret key) generated in S201 into the function F. Next, once the challenge code is received from the ECU 10 in S207, the program goes to S208, in which the code encryption unit 214 encrypts the challenge code using the third value C (common key) and transmits the result as a response code to the ECU 10.

In the ECU 10, after the response code transmitted from the update tool 20 is received in S106, the code decryption unit 114 decrypts the response code using the fourth value D (common key) generated in S104. Next, in S107, the authentication determination unit 115 determines whether the code decrypted in S106 matches the code generated in S105. When the result in S107 is YES, the program goes to S108, and when NO, authentication/confirmation processing in the ECU 10 is terminated. In S108, the update allow unit 116 allows update of vehicle control software by the update tool 20.

Figure 4:
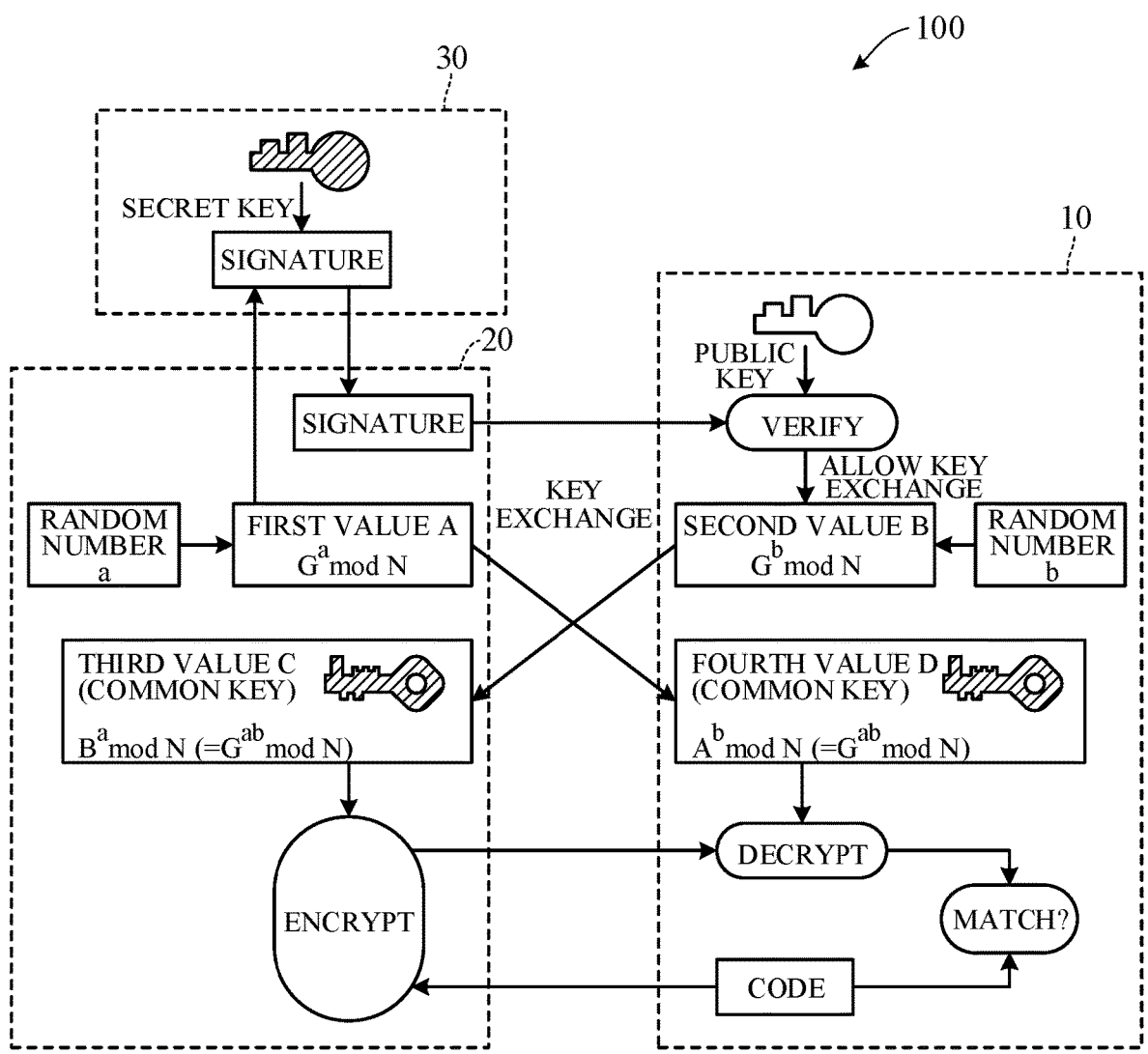
FIG. 4 is a diagram explaining the processing by the authentication system of FIG. 2.

FIG. 4 is a diagram explaining the processing by the authentication system 100. There now follows a more concrete explanation with reference to FIG. 4 of the main actions of the authentication system 100 according to the present embodiment. User of the update tool 20 plans to update vehicle control software outside range of the network 4 (FIG. 1). Beforehand, while still inside range of the network 4, user inputs an authentication request using a keyboard or other input device of the update tool 20, whereby authentication information, public key for key exchange and user designated validity period are transmitted from the update tool 20 to the authentication server 30 (S200 and S201). Upon authenticating validity of the update tool 20 based on the received authentication information, the authentication server 30 signs the received public key with a validity period tagged signature and transmits it to the update tool 20 (S300 to S303). After confirming through a monitor or other display device of the update tool 20 that authentication succeeded (S202), user can take the update tool 20 outside range of the network 4.

When user connects the update tool 20 to the ECU 10 of the vehicle concerned outside network 4 range, the public key for key exchange of the update tool 20 and the validity period tagged signature are transmitted from the update tool 20 to the ECU 10 (S203 and S204). The ECU 10 verifies whether the received signature is valid and when valid, transmits public key for key exchange of the ECU 10 and a challenge code to the update tool 20 (S100 to S103 and S105). The update tool 20 generates a common key from the public key of the ECU 10, uses the generated common key to encrypt the challenge code and transmits the result to the ECU 10 as a response code (S205 to S208). The ECU 10 generates a common key from the public key of the update tool 20, uses the generated common key to decrypt the response code, and if the result matches the challenge code, allows update of vehicle control software by the update tool 20 (S104 and S106 to S108). As regards multiple ECUs 10 possessing public keys corresponding to the same secret keys, such as ECUs 10 and the like installed in multiple vehicles of the same vehicle maker, update of vehicle control software can be performed sequentially within validity period (S203 to S208 and S100 to S108).

As a result, whether an update tool 20 is one whose validity was authenticated by the authentication server 30 can be confirmed from the side of the ECU 10 when outside range of the network 4. Unauthorized access can be reliably prevented by allowing key exchange only after signature verification and further verifying identity of common key generated at key exchange. In addition, it is possible by setting a signature validity period to reduce probability of unauthorized update of vehicle control software by an ill-intentioned third party who later obtains the pre-authenticated update tool 20. The probability of this happening can be even further lowered by setting the validity period to be forcibly terminated when the update tool 20 enters range of the network 4.

The present embodiment can achieve advantages and effects such as the following:

(1) The authentication system 100 includes: the ECU 10 installed in vehicle; the update tool 20 communicatively connected to the ECU 10 to update control software of the ECU 10; and the authentication server 30 communicatively connected to the update tool 20 to authenticate validity of the update tool 20 (FIGS. 1 and 2).

The update tool 20 includes: the first random number generator 211 for generating the first random number a (secret key); and the substitution unit 212 for substituting the constant G and the first random number a generated by the first random number generator 211 into the predetermined function F to generate the first value A (public key for key exchange) and transmitting the generated first value A to the authentication server 30. The authentication server 30 includes the signature authentication unit 311 adapted to use a predetermined secret key to generate signature of the first value A received from the update tool 20 and transmit the signature to the update tool 20. The update tool 20 further includes: the memory 22 for storing the first value A generated by the substitution unit 212 and the signature received from the authentication server 30; and the transfer unit 213 responsive to connection of the update tool 20 to the ECU 10 for transferring the first value A and the signature stored in the memory 22 to the ECU 10 (FIG. 2).

The ECU 10 includes the signature verifier 110 adapted to use a predetermined public key corresponding to the secret key to verify whether the signature received from the update tool 20 is valid; the second random number generator 111 for generating the second random number b (secret key); and the substitution unit 112 for substituting the constant G and the second random number b generated by the second random number generator 111 into the predetermined function F to generate the second value B (public key for key exchange) and transmitting the generated second value B to the update tool 20 (FIG. 2).

The substitution unit 212 generates the third value C (common key) by substituting the second value B (public key) received from the ECU 10 and the first random number a (secret key) generated by the first random number generator 211 into the function F. The substitution unit 112 is responsive to the signature being confirmed valid by the signature verifier 110 for generating the fourth value D (common value) by substituting the first value A (public key) received from the update tool 20 and the second random number b (secret key) generated by the second random number generator 111 into the function F.

The ECU 10 further includes: the authentication determination unit 115 for determining whether the third value C generated by the substitution unit 212 and the fourth value D generated by the substitution unit 112 are identical, and when determining them to be identical, determining that update tool 20 is an update tool whose validity was authenticated by the authentication server 30; and the update allow unit 116 for allowing control software update by the update tool 20 (FIG. 2).

Whether an update tool 20 is one whose validity was authenticated by the authentication server 30 can therefore be confirmed from the side of the ECU 10 when outside range of the network 4. Unauthorized access can be reliably prevented by allowing key exchange only after signature verification and further verifying identity of common key generated at key exchange.

(2) The ECU 10 further includes the code generator 113 responsive to connection of the update tool 20 for generating code and transmitting generated code to the update tool 20. The update tool 20 further includes the code encryption unit 214 adapted to use the third value C (common key) generated by the substitution unit 212 to encrypt code received from the ECU 10 and transmit encrypted code to the ECU 10. The ECU 10 further includes the code decryption unit 114 adapted to use the fourth value D (common key) generated by the substitution unit 112 to decrypt encrypted code received from the update tool 20 (FIG. 2). The authentication determination unit 115 determines whether code generated by the code generator 113 and code decrypted by the code decryption unit 114 are identical, and when it determines them to be identical, determines that the third value C generated by the substitution unit 212 and the fourth value D generated by the substitution unit 112 are identical.

Owing to this configuration, whether an update tool 20 is one whose validity was authenticated by the authentication server 30 can be confirmed by verifying whether the common keys generated at key exchange on the ECU 10 side and the update tool 20 side are identical.

(3) A signature is valid for a predetermined period. Setting a signature validity period enables update of vehicle control software of the ECU 10 only within the validity time period. This reduces probability of unauthorized update of vehicle control software by an ill-intentioned third party who later comes into possession of the pre-authenticated update tool 20.

(4) The signature authentication unit 311 sets a predetermined time period. For example, the signature authentication unit 311 assigns a predetermined validity period to the signature generated on the authentication server 30 side in accordance with user instruction transmitted to the authentication server 30 through the update tool 20. The validity period can, for example, be designated as required with consideration to time and date when user of the update tool 20 plans to update vehicle control software, so that probability of unauthorized update of vehicle control software by an ill-intentioned third party who later comes into possession of the pre-authenticated update tool 20 can be still more positively reduced.

(5) A signature is invalidated even within the predetermined validity period when the update tool 20 and authentication server 30 go from unconnected state to connected state. This is achieved by setting the validity period to be forcibly terminated when the update tool 20 enters range of the network 4 and has the effect of further decreasing the probability of unauthorized update of vehicle control software by an ill-intentioned third party who later acquires the pre-authenticated update tool 20.

First Modification

Figure 5:
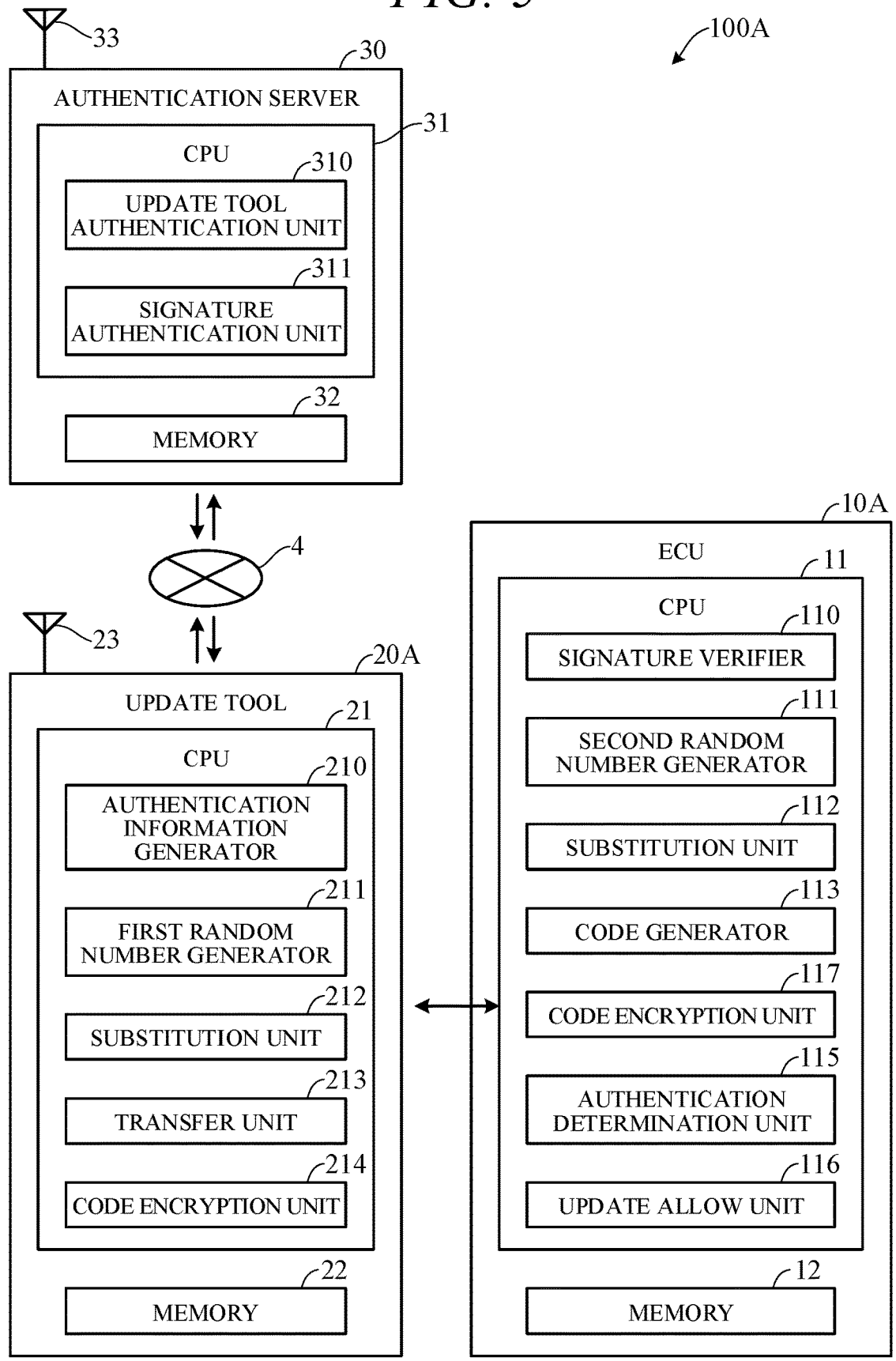
FIG. 5 is a block diagram showing structure of an authentication system according to a first modification of the present invention.
Figure 6:
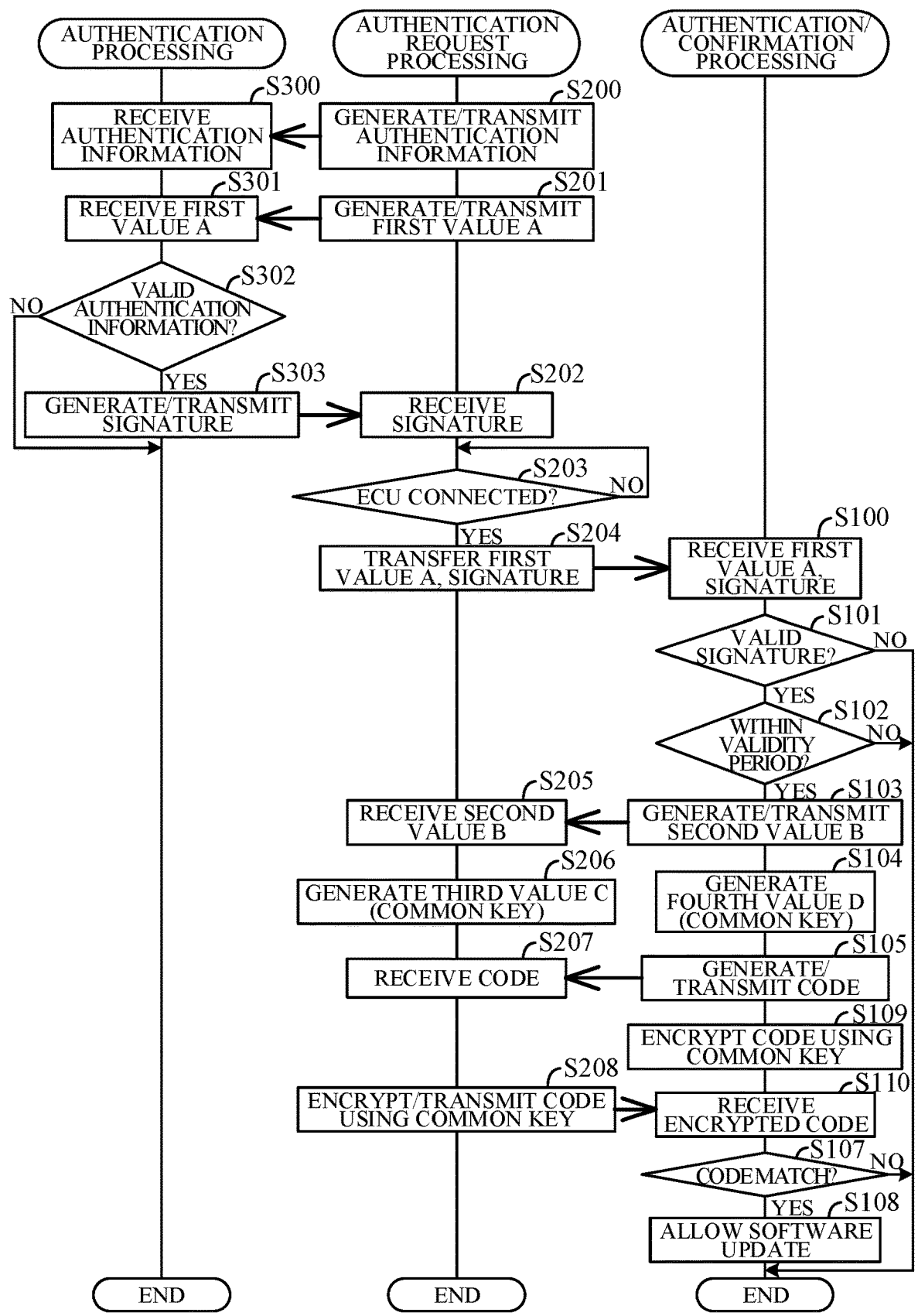
FIG. 6 is a flowchart showing an example of processing performed by the authentication system of FIG. 5.
Figure 7:
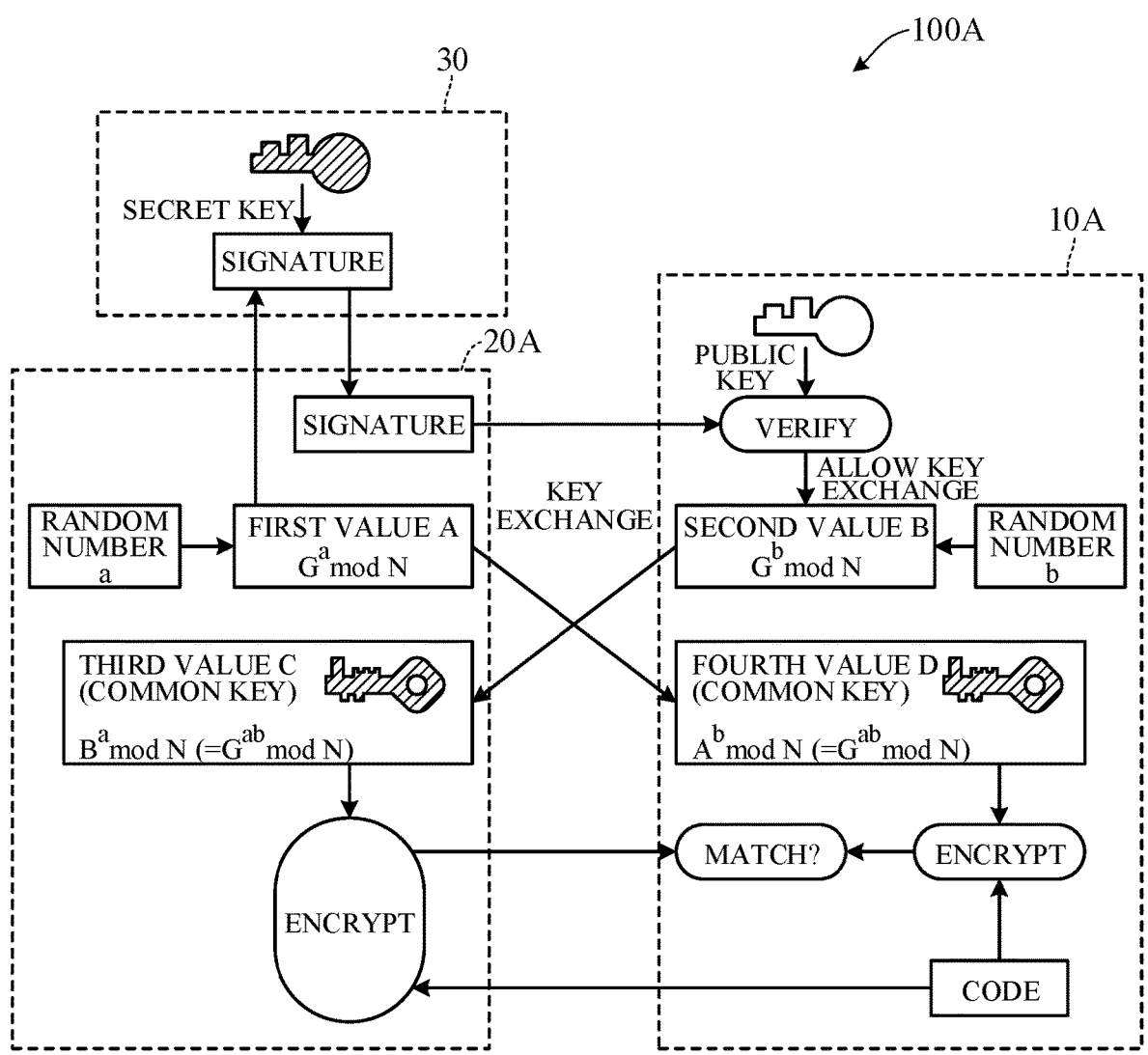
FIG. 7 is a diagram explaining the processing by the authentication system of FIG. 5.

FIGS. 5 to 7, which correspond to FIGS. 2 to 4, show a first modification of the authentication system according to the present invention. Like constituents in FIGS. 5 to 7 and FIGS. 2 to 4 are assigned like symbols. The authentication system 100A according to the first modification differs from the authentication system 100 according to the aforesaid embodiment in configuration for verifying whether ECU 10A side common key and update tool 20A side common key are identical. Namely, as shown in FIG. 5, the ECU 10A of the authentication system 100A includes a code encryption unit 117 instead of the code decryption unit 114 (FIG. 2).

As shown in FIG. 6, in S109, the code encryption unit 117 of the ECU 10A encrypts the code generated in S105 using the fourth value (common key) generated in S104. In S107, the authentication determination unit 115 determines whether the response code received from the update tool 20A in S110 matches the code encrypted in S109. Specifically, as shown in FIG. 7, insofar as the code was encrypted using the same common key as generated at key exchange, the code encrypted on the ECU 10A side matches the code encrypted on the update tool 20A side. The code encrypted using the ECU 10A side common key (fourth value D) matches the code encrypted using the update tool 20A side common key (third value C), which is the response code. In the authentication system 100A, whether the update tool 20A is one whose validity was authenticated by the authentication server 30 is determined by determining whether these codes are identical. With this, also in the authentication system 100A according to the first modification, whether an update tool 20A is one whose validity was authenticated by the authentication server 30 can therefore be confirmed from the side of the ECU 10A when outside range of the network 4. Unauthorized access can be reliably prevented by allowing key exchange only after signature verification and further verifying identity of common key generated at key exchange.

In the authentication system 100A according to the first modification, the update tool 20A includes the code encryption unit 214 adapted to use the fourth value D generated by the substitution unit 112 to encrypt code generated by the code generator 113 (FIG. 5). The authentication determination unit 115 determines whether the encrypted code received from the update tool 20A and the code encrypted by the code encryption unit 117 are identical, and when it determines them to be identical, determines that the third value C generated by the substitution unit 212 and the fourth value D generated by the substitution unit 112 are identical.

Owing to this configuration, also in the authentication system 100A according to the first modification, whether an update tool 20A is one whose validity was authenticated by the authentication server 30 can be confirmed by verifying whether the common keys generated at key exchange on the ECU 10A side and the update tool 20A side are identical.

Second Modification

Figure 8:
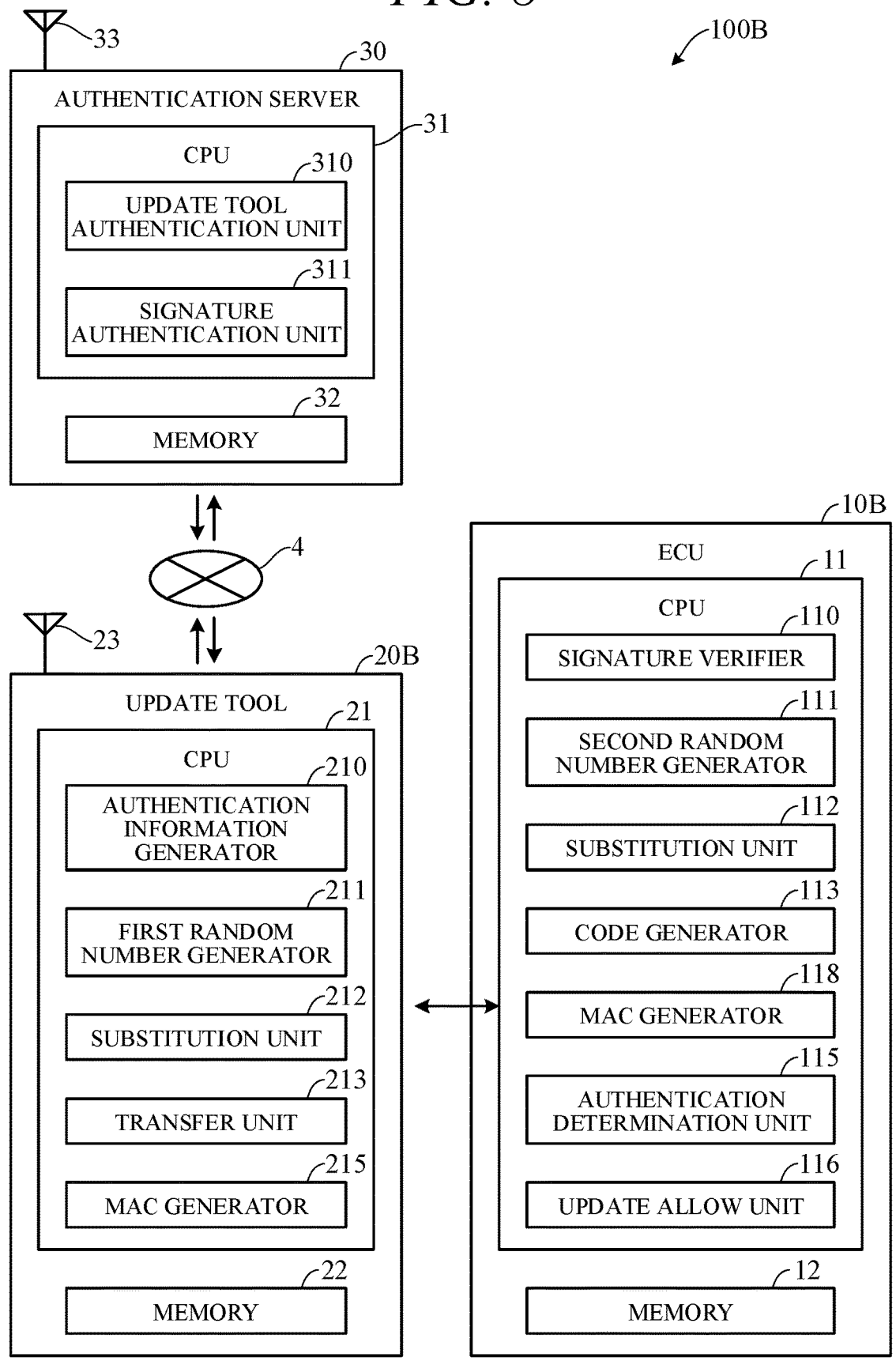
FIG. 8 is a block diagram showing structure of an authentication system according to a second modification of the present invention.
Figure 9:
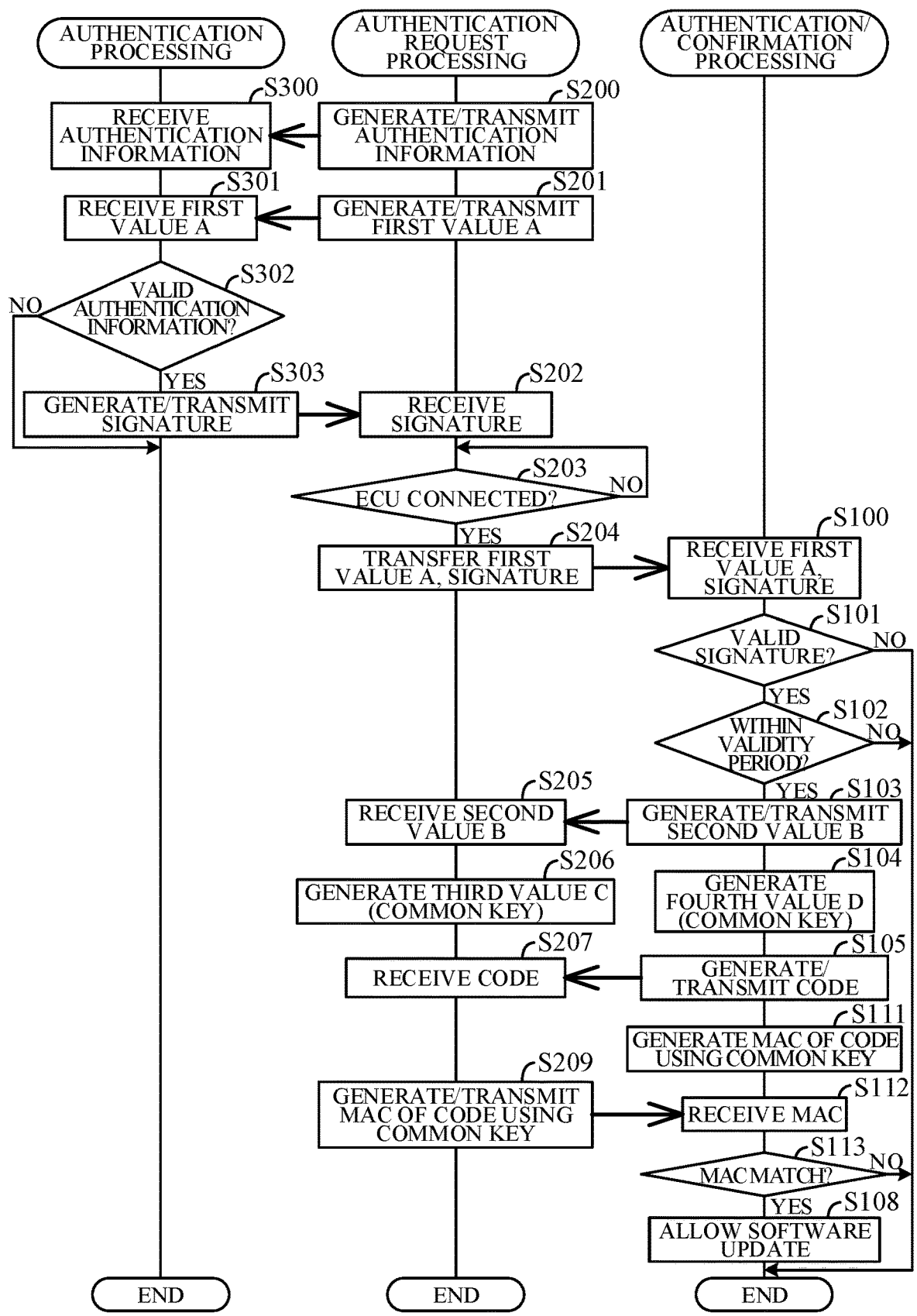
FIG. 9 is a flowchart showing an example of processing performed by the authentication system of FIG. 8.
Figure 10:
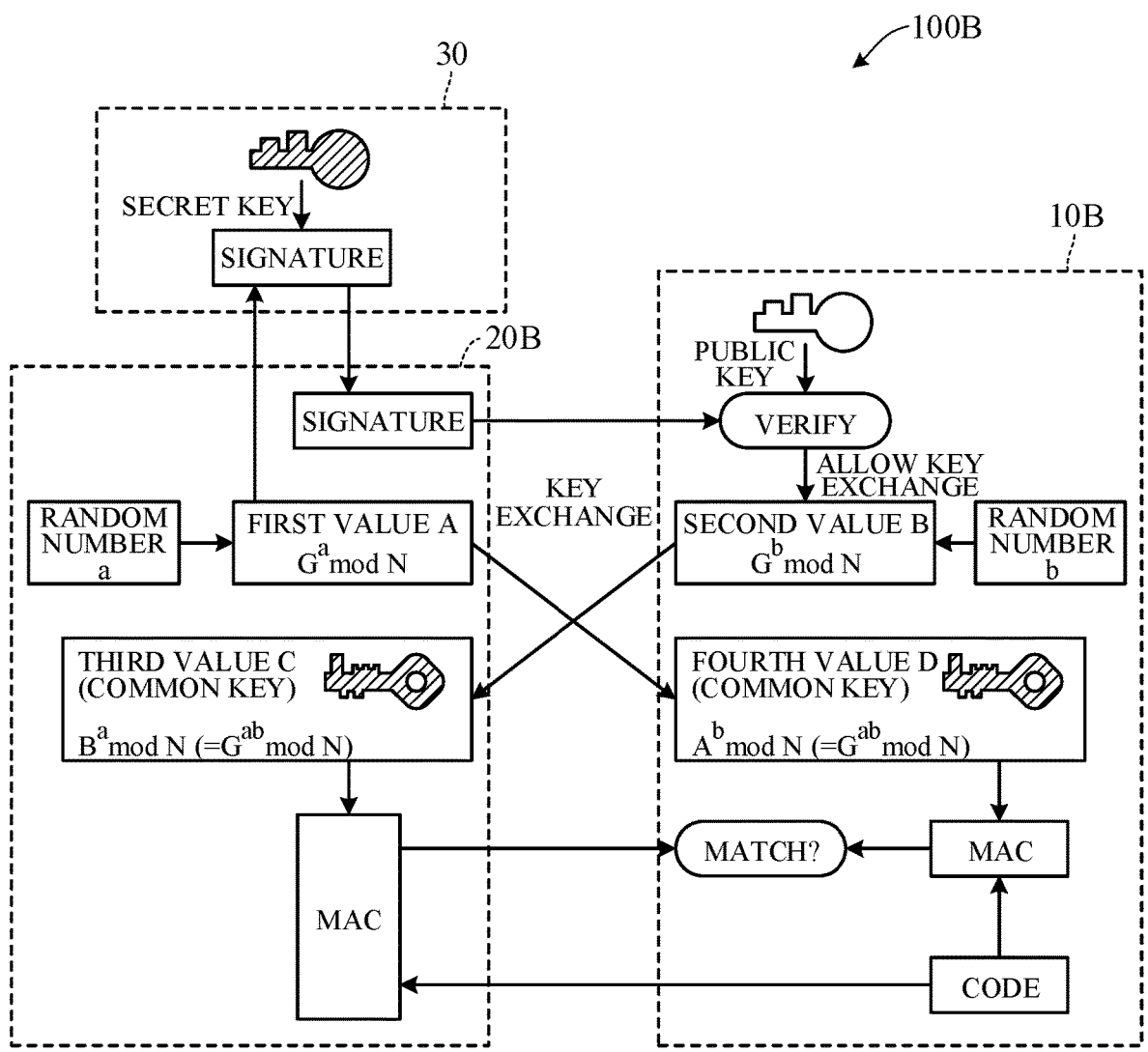
FIG. 10 is a diagram explaining the processing by the authentication system of FIG. 8.

FIGS. 8 to 10, which correspond to FIGS. 2 to 4, show a second modification of the authentication system according to the present invention. Like constituents in FIGS. 8 to 10 and FIGS. 2 to 4 are assigned like symbols. The authentication system 100B according to the second modification differs from the authentication system 100 according to the aforesaid embodiment in configuration for verifying whether ECU 10B side common key and update tool 20B side common key are identical. Namely, as shown in FIG. 8, the update tool 20B of the authentication system 100B includes a MAC generator 215 instead of the code encryption unit 214 (FIG. 2) and the ECU 10B includes a MAC generator 118 instead of the code decryption unit 114 (FIG. 2).

As shown in FIG. 9, in S209, the MAC generator 215 of the update tool 20B generates a message authentication code (MAC) of the challenge code received from the ECU 10B in S207 using the third value (common key) generated in S206, and transmits it to the ECU 10B as a response code. In S111, the MAC generator 118 of the ECU 10B generates MAC of the code generated in S105 using the fourth value D (common key) generated in S104. In S113, the authentication determination unit 115 determines whether the response code received from the update tool 20B in S112 matches the MAC generated in S111.

Specifically, as shown in FIG. 10, insofar as the MAC was generated using the same common key as generated at key exchange, the MAC generated on the ECU 10B side matches the MAC generated on the update tool 20B side. The MAC generated using the ECU 10B side common key (fourth value D) matches the MAC generated using the update tool 20B side common key (third value C), which is the response code. In the authentication system 100B, whether the update tool 20B is one whose validity was authenticated by the authentication server 30 is determined by determining whether these MACs are identical. With this, also in the authentication system 100B according to the second modification, whether an update tool 20B is one whose validity was authenticated by the authentication server 30 can therefore be confirmed from the side of the ECU 10B when outside range of the network 4. Unauthorized access can be reliably prevented by allowing key exchange only after signature verification and further verifying identity of common key generated at key exchange.

In the authentication system 100B according to the second modification, the update tool 20B includes the MAC generator 215 adapted to use the third value C generated by the substitution unit 212 to generate MAC of the code received from the ECU 10B and transmit the generated MAC to the ECU 10B. The ECU 10B includes the MAC generator 118 adapted to use the fourth value D generated by the substitution unit 112 to generate MAC of the code generated by the code generator 113 (FIG. 8). The authentication determination unit 115 determines whether the MAC received from the update tool 20B and the MAC generated by the MAC generator 118 are identical, and when it determines them to be identical, determines that the third value C generated by the substitution unit 212 and the fourth value D generated by the substitution unit 112 are identical.

Owing to this configuration, also in the authentication system 100B according to the second modification, whether an update tool 20B is one whose validity was authenticated by the authentication server 30 can be confirmed by verifying whether the common keys generated at key exchange on the ECU 10B side and the update tool 20B side are identical.

Third Modification

Figure 11:
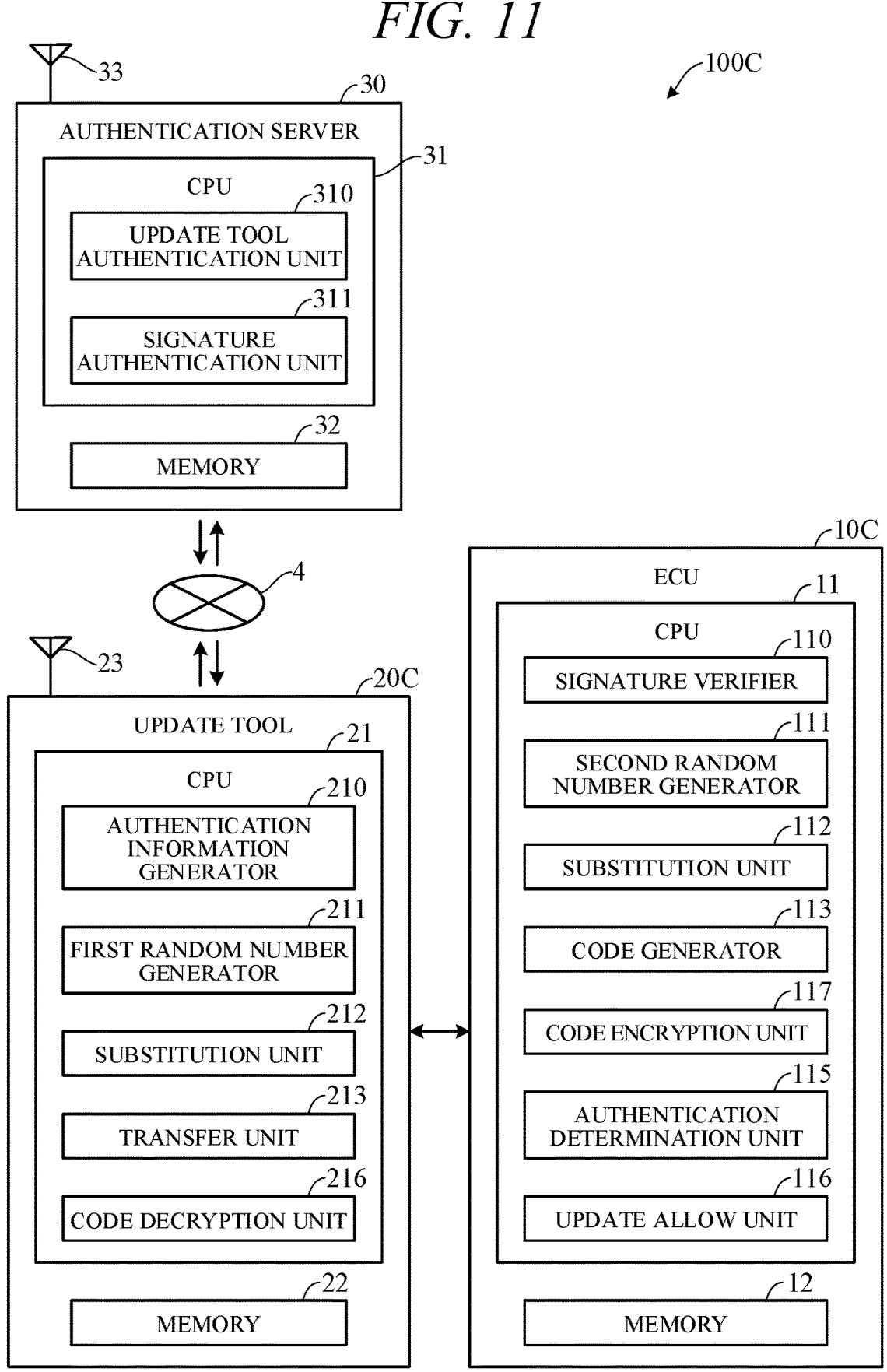
FIG. 11 is a block diagram showing structure of an authentication system according to a third modification of the present invention.
Figure 12:
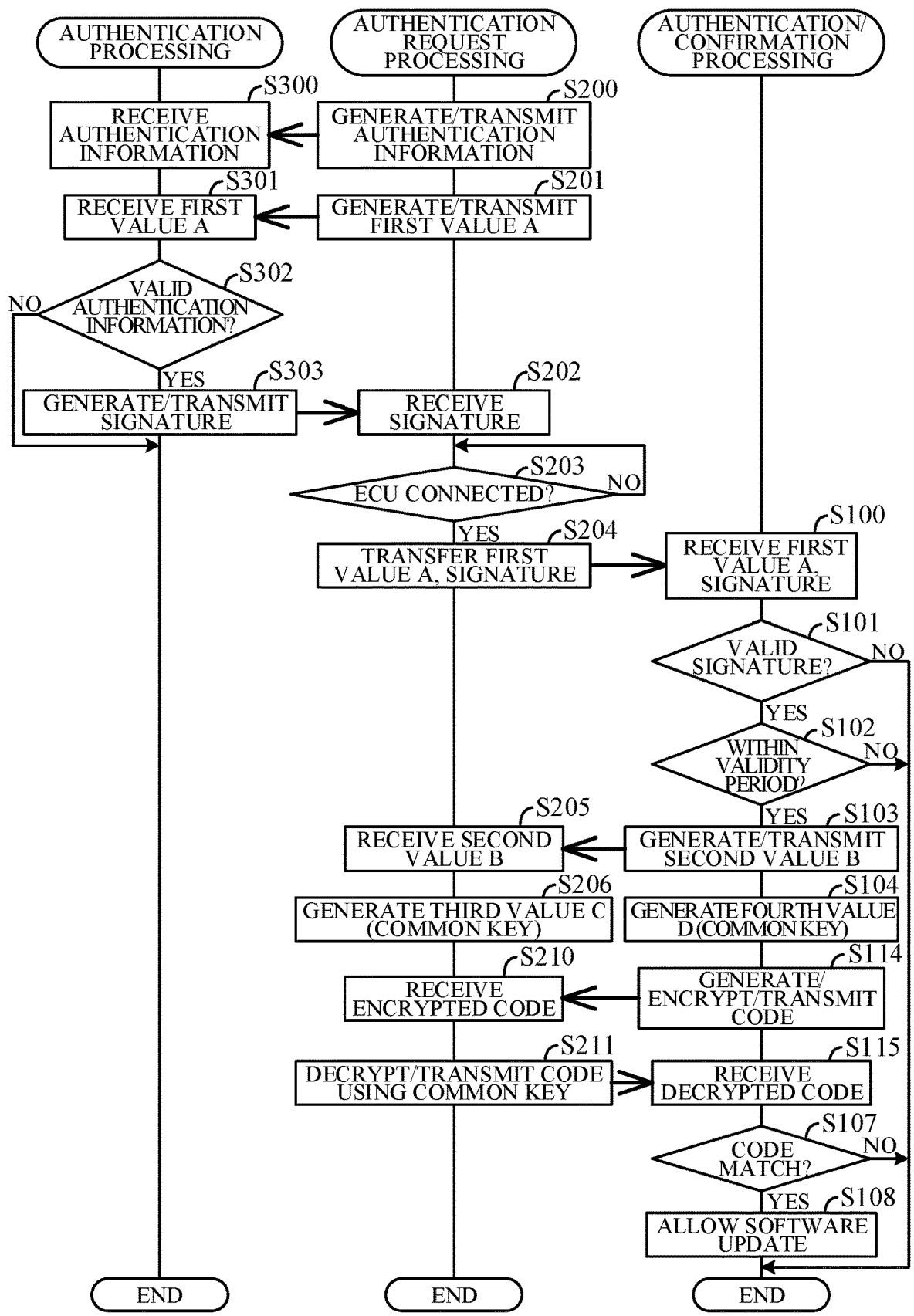
FIG. 12 is a flowchart showing an example of processing performed by the authentication system of FIG. 11.
Figure 13:
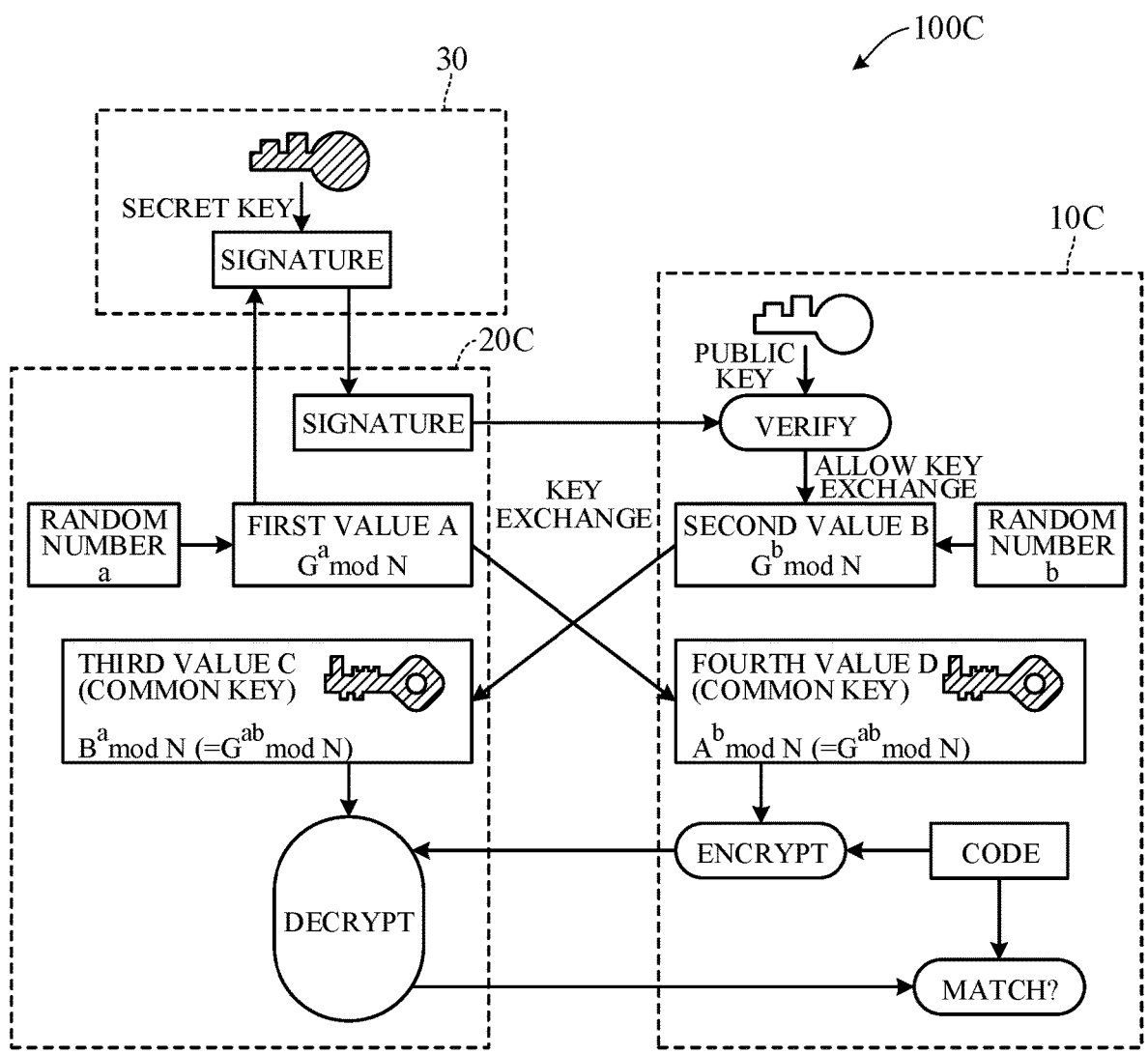
FIG. 13 is a diagram explaining the processing by the authentication system of FIG. 11.

FIGS. 11 to 13, which correspond to FIGS. 2 to 4, show a third modification of the authentication system according to the present invention. Like constituents in FIGS. 11 to 13 and FIGS. 2 to 4 are assigned like symbols. The authentication system 100C according to the third modification differs from the authentication system 100 according to the aforesaid embodiment in configuration for verifying whether ECU 10C side common key and update tool 20C side common key are identical. Namely, as shown in FIG. 11, the update tool 20C of the authentication system 100C includes a code decryption unit 216 instead of the code encryption unit 214 (FIG. 2) and the ECU 10C includes the code encryption unit 117 instead of the code decryption unit 114 (FIG. 2).

As shown in FIG. 12, in S114, the code generator 113 and the code encryption unit 117 of the ECU 10C generates a code composed of random numbers, encrypts it using the fourth value D (common key) generated in S104 and transmits it to the update tool 20C as a challenge code. In S211, the code decryption unit 216 of the update tool 20C decrypts the challenge code received from the ECU 10C in S210 using the third value C (common key) generated in S206, and transmits it to the ECU 10C as a response code. In S107, the authentication determination unit 115 of the ECU 10C determines whether the response code received from the update tool 20C in S115 matches the code generated in S114.

Specifically, as shown in FIG. 13, insofar as the code was encrypted and decrypted using the same common key as generated at key exchange, the code generated on the ECU 10C side matches the code decrypted on the update tool 20C side. The code generated on the ECU 10C side matches the code encrypted using the ECU 10C side common key (fourth value D) and decrypted using the update tool 20C side common key (third value C), which is the response code. In the authentication system 100C, whether the update tool 20C is one whose validity was authenticated by the authentication server 30 is determined by determining whether these codes are identical. With this, also in the authentication system 100C according to the third modification, whether an update tool 20C is one whose validity was authenticated by the authentication server 30 can therefore be confirmed from the side of the ECU 10C when outside range of the network 4. Unauthorized access can be reliably prevented by allowing key exchange only after signature verification and further verifying identity of common key generated at key exchange.

In the authentication system 100C according to the third modification, the ECU 10C includes: the code generator 113 adapted to generate a code upon connection of the update tool 20C; and the code encryption unit 117 adapted to use the fourth value D generated by the substitution unit 112 to encrypt the code generated by the code generator 113 and transmit the encrypted code to the update tool 20C. The update tool 20C includes the code decryption unit adapted to use the third value C generated by the substitution unit 212 to decrypt the encrypted code received from the ECU 10C and transmit the decrypted code to the ECU 10C (FIG. 11). The authentication determination unit 115 determines whether the code generated by the code generator 113 and the decrypted code received from the update tool 20C are identical, and when it determines them to be identical, determines that the third value C generated by the substitution unit 212 and the fourth value D generated by the substitution unit 112 are identical.

Owing to this configuration, also in the authentication system 100C according to the third modification, whether an update tool 20C is one whose validity was authenticated by the authentication server 30 can be confirmed by verifying whether the common keys generated at key exchange on the ECU 10C side and the update tool 20C side are identical.

In the configuration described in the foregoing, the ECU 10 and update tool 20 are wire-connected through a vehicle DLC by CAN or the like, but the update tool communicatively connected to the ECU for updating control software of the ECU is not limited to this configuration. Alternatively, the update tool 20 can, for example, be configured to communicate with the ECU 10 via a short-distance wireless technology such as Wi-Fi® (Wireless Fidelity) or Bluetooth®.

In the configuration described in the foregoing, the signature authentication unit 311 sets validity period, but the signature generator for generating signature can optionally be configured not to set validity period. Also optionally, a GPS sensor can be used to set a valid range of signature acquirable locations in addition a signature validity time period. For example, a configuration can be adopted whereby user of the update tool 20 can as required designate a valid range matched to area where update of vehicle control software is to be performed.

The above embodiment can be combined as desired with one or more of the above modifications. The modifications can also be combined with one another.

According to the present invention, it becomes possible to update vehicle control software by a pre-authenticated update tool when outside range of the network.

Above, while the present invention has been described with reference to the preferred embodiments thereof, it will be understood, by those skilled in the art, that various changes and modifications may be made thereto without departing from the scope of the appended claims.

What is claimed is:

1. An authentication system, comprising:
an electronic control unit installed in a vehicle and configured to control operation of the vehicle;
an update tool configured to be communicatively connected to the electronic control unit to update a control software of the electronic control unit; and
an authentication server configured to be communicatively connected to the update tool to authenticate validity of the update tool, wherein
the update tool includes a first CPU and a first memory coupled to the first CPU, wherein
the first CPU and the first memory are configured to perform
generating a first random number,
substituting a predetermined constant and the first random number generated into a predetermined function to generate a first value,
storing the first value generated in the first memory, and
transmitting the first value stored in the first memory to the authentication server,
wherein
the authentication server includes a second CPU and a second memory coupled to the second CPU, wherein
the second CPU and the second memory are configured to perform
generating a signature of the first value transmitted from the update tool using a predetermined secret key, and
transmitting the signature generated to the update tool, wherein the first CPU and the first memory are configured to perform
storing the signature transmitted from the authentication server in the first memory, and
transmitting the first value and the signature stored in the first memory to the electronic control unit when the update tool is connected to the electronic control unit,
wherein
the electronic control unit includes a third CPU and a third memory coupled to the third CPU, wherein
the third CPU and the third memory are configured to perform
verifying whether the signature transmitted from the update tool is valid using a predetermined public key corresponding to the predetermined secret key,
generating a second random number,
substituting the predetermined constant and the second random number generated into the predetermined function to generate a second value, and
transmitting the second value generated to the update tool, wherein the first CPU and the first memory are configured to perform
substituting the second value transmitted from the electronic control unit and the first random number generated into the predetermined function to generate a third value, wherein
the third CPU and the third memory are configured to perform
substituting the first value transmitted from the update tool and the second random number generated into the predetermined function to generate a fourth value when it is verified that the signature is valid,
determining whether the third value generated on the side of the update tool and the fourth value generated on the side of the electronic control unit are identical, and when determined to be identical, determining that the update tool is the update tool whose validity was authenticated by the authentication server, and allowing update of the control software by the update tool.

2. The authentication system according to claim 1, wherein
the third CPU and the third memory are configured to perform
generating a third random number when the electronic control unit is connected to the update tool, and
transmitting the third random number generated to the update tool, wherein the first CPU and the first memory are configured to perform
encrypting the third random number transmitted from the electronic control unit using the third value, and
transmitting the third random number encrypted on the side of the update tool to the electronic control unit, wherein
the third CPU and the third memory are configured to perform
decrypting the third random number encrypted on the side of the update tool and transmitted from the update tool using the fourth value, and
determining whether the third random number generated and the third random number decrypted are identical, and when determined to be identical, determining that the third value generated on the side of the update tool and the fourth value generated on the side of the electronic control unit are identical.

3. The authentication system according to claim 1, wherein
the third CPU and the third memory are configured to perform
generating a third random number when the electronic control unit is connected to the update tool, and
transmitting the third random number generated to the update tool, wherein the first CPU and the first memory are configured to perform
encrypting the third random number transmitted from the electronic control unit using the third value, and
transmitting the third random number encrypted to the electronic control unit,
wherein
the third CPU and the third memory are configured to perform
encrypting the third random number generated using the fourth value, and
determining whether the third random number encrypted and transmitted from the update tool and the third random number encrypted are identical, and when determined to be identical, determining that the third value generated on the side of the update tool and the fourth value generated on the side of the electronic control unit are identical.

4. The authentication system according to claim 1, wherein
the third CPU and the third memory are configured to perform
generating a third random number when the electronic control unit is connected to the update tool, and
transmitting the third random number generated to the update tool, wherein the first CPU and the first memory are configured to perform generating a message authentication code of the third random number transmitted from the electronic control unit using the third value, and transmitting the message authentication code generated using the third value to the electronic control unit, wherein the third CPU and the third memory are configured to perform generating a message authentication code of the third random number generated using the fourth value, and determining whether the message authentication code generated using the third value and transmitted from the update tool and the message authentication code generated using the fourth value are identical, and when determined to be identical, determining that the third value generated on the side of the update tool and the fourth value generated on the side of the electronic control unit are identical.

5. The authentication system according to claim 1, wherein the third CPU and the third memory are configured to perform generating a third random number when the electronic control unit is connected to the update tool, encrypting the third random number generated using the fourth value, and transmitting the third random number encrypted to the update tool, wherein the first CPU and the first memory are configured to perform decrypting the third random number encrypted and transmitted from the electronic control unit using the third value, and transmitting the third random number decrypted to the electronic control unit, wherein the third CPU and the third memory are configured to perform determining whether the third random number generated and the third random number decrypted and transmitted from the update tool are identical, and when determined to be identical, determining that the third value generated on the side of the update tool and the fourth value generated on the side of the electronic control unit are identical.

6. The authentication system according to claim 1, wherein the signature is valid for a predetermined period.

7. The authentication system according to claim 6, wherein the second CPU and the second memory are configured to perform setting the predetermined period.

8. The authentication system according to claim 6, wherein the signature is invalidated even within the predetermined period when the update tool and the authentication server are switched from an unconnected state to a connected state.

* * * * *